US005607703A

United States Patent [19]
Sakai et al.

[11] Patent Number: 5,607,703
[45] Date of Patent: Mar. 4, 1997

[54] ROLLER HEAD EXTRUDER UNIT

[75] Inventors: Kenji Sakai; Yoshihiro Hamada; Katsunobu Hagiwara, all of Kobe; Toshio Ujihara, Takasago; Toshio Yanagihara, Takasago; Hiromi Nakano, Takasago, all of Japan

[73] Assignee: Kabushiki Kaisha Kobe Seiko Sho, Kobe, Japan

[21] Appl. No.: 354,127

[22] Filed: Dec. 6, 1994

[30] Foreign Application Priority Data

Dec. 6, 1993 [JP] Japan .................................. 5-305332

[51] Int. Cl.⁶ .................................................. B29C 47/92
[52] U.S. Cl. ...................... 425/145; 264/40.7; 264/175; 264/176.1; 425/327; 425/363; 425/376.1; 425/DIG. 235
[58] Field of Search ...................... 425/145, 147, 425/149, 327, 363, 367, DIG. 235, 381, 376.1; 264/40.7, 175, 176.1

[56] References Cited

U.S. PATENT DOCUMENTS

| 3,274,645 | 9/1966 | Chase ................................... 425/367 |
| 3,359,597 | 12/1967 | Bainston ...................... 425/DIG. 235 |
| 3,543,333 | 12/1970 | Anders et al. . |
| 4,028,031 | 6/1977 | Seide ...................................... 425/327 |
| 4,256,448 | 3/1981 | Carle ............................ 425/DIG. 235 |
| 4,304,539 | 12/1981 | Hagiwara et al. ...................... 425/363 |

FOREIGN PATENT DOCUMENTS

| 54-63183 | 5/1979 | Japan . |
| 1423984 | 2/1976 | United Kingdom ......... 425/DIG. 235 |

*Primary Examiner*—Jay H. Woo
*Assistant Examiner*—Joseph Leyson
*Attorney, Agent, or Firm*—Oblon, Spivak, McClelland, Maier & Neustadt, P.C.

[57] ABSTRACT

A roller head extruder unit includes an extruder unit, a pair of calender rollers arranged forward of an exit opening of the extruder unit and supported for rotation by a support frame mounted securely with respect to the extruder unit, and side guides arranged on either side of a space between the exit opening of the extruder unit and the calender rollers to thereby define a bank into which material for rolling is extruded. At least one of the upper and lower rollers is mounted for rotation in a roller housing supported by the support frame for limited movement in a direction perpendicular to the axis of the upper and lower rollers. The roller head extruder unit also includes a detection device for detecting the force with which this roller housing is caused to move as a result of accumulation of material in the bank.

7 Claims, 8 Drawing Sheets

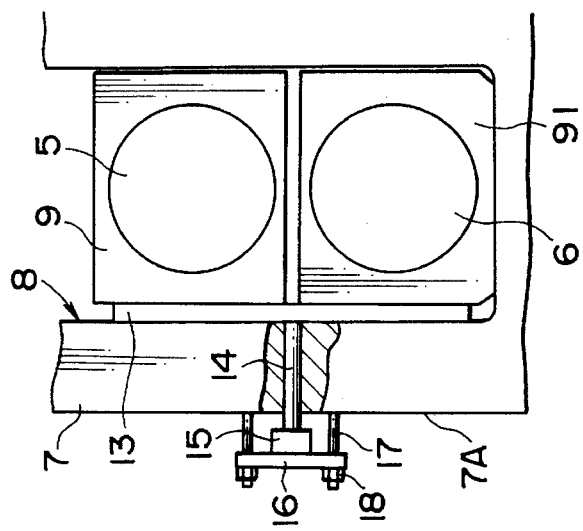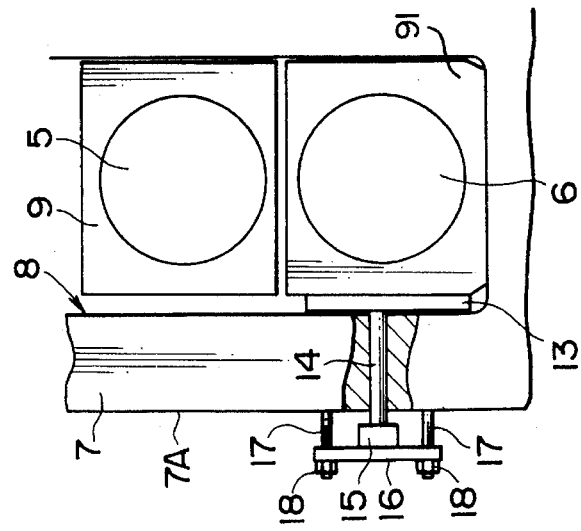

ROLLER HEAD EXTRUDER UNIT

FIELD OF THE INVENTION

This invention relates to a roller head extruder unit of the type wherein material extruded from an extruder is supplied between a pair of calender rollers to be rolled into sheets thereby.

DESCRIPTION OF THE PRIOR ART

A typical roller head unit is shown in FIGS. 8 and 9. A pair of right and left frames 44 are positioned/forward of the exit opening 43 of an extruder unit 41. A pair of upper and lower calender rollers 45, 46 are mounted for rotation about their axis on said frames 44, and are driven for rotation by drive means (not shown). A pair of left and right side guides 47 are mounted forward of said exit opening 43 in a position between said calender rollers 45, 46; and a macromolecular material e.g. rubber extruded from said opening 43 is rolled into a sheet by said calender rollers 45, 46.

It is required that the space (known as bank) defined between the exit opening 43, the calender rollers 45, 46 and the sideguides 47 be filled with a specified quantity of extruded material M during the operation of the extruder unit. If the bank quantity (quantity of material accumulated in the bank) is not maintained at the specified quantity, problems can occur. For example, if the actual bank quantity is excessively smaller than the specified quantity, then tears in the sheet can occur; and if the actual bank quantity is excessively greater than the specified quantity then leakages of the extruded material can occur and it becomes impossible to obtain a sheet of uniform width.

To avoid these problems, a bank quantity detection device is installed for detecting the actual bank quantity at any time, (the bank quantity is intercorrelated with the pressure inside the bank i.e. head pressure) and the rotation speed of the extruder screws and/or the calender rollers is controlled in accordance with a signal from said detection means such that the bank quantity is maintained at a constant level.

The width of the sheet is determined by regulating the width of the extruded material using sideguides 47.

Japanese Patent Publication Sho 55-4575 discloses such a kind of bank quantity detection device. As shown in FIGS. 8 and 9, this device comprises a load cell 51 located between a flange 50 of the extruder unit 41 and a lock plate 49 fixed on the extruder unit side of the frame 44 so as to face the rear face of the flange 50. Frame 44 is mounted on head 48 for sliding movement with respect thereto in a direction parallel to the axis of the extruder screw. The whole frame including the calender rollers 45, 46 is subject to a pushing force as the mass of extruded material in the bank fills the bank and this force is detected by load cell 51 and the bank quantity is inferred therefrom.

However the following problems exist with the kind of detection device described above:

(a) in the case of small size extruder units the space between the lock plate and the flange is too small to be able to install a load cell;

(b) even in the case of medium and large sized extruder units in which there is sufficient room between the flange and the lock plate to install a load cell, since the load cell is installed in a location surrounded on all four sides it is difficult to access the load cell to effect maintenance thereof.

The present invention has as its objective to provide a roller head extruder unit incorporating a bank quantity detection device which can assuredly detect the bank quantity and which can be easily accessed for maintenance etc.

SUMMARY OF THE INVENTION

The present invention provides a roller head extruder for forming sheets of extruded material comprising: an extruder unit having an exit opening at one end through which material is extruded; support frame mounted securely with respect to the extruder unit; a pair of upper and lower rollers positioned forward of the exit opening to receive extruded material therebetween and supported for rotation by said support frame, wherein at least one of the upper and lower rollers is supported for rotation in a roller housing, said roller housing being supported by said support frame for limited movement in a direction perpendicular to the axis of the upper and lower rollers; a pair of sideguides mounted on either side of the space between the exit opening and the upper and lower rollers to thereby define together with the upper and lower rollers and the exit opening a bank into which the material is extruded; and detection means for detecting the force by which at least one of the roller housings supported for limited movement in a direction perpendicular to the axis of the upper and lower rollers is pushed in a direction away from the extruder unit as a result of the accumulation of extruded material in the bank.

The detection means may comprise for example a load cell fixed to an external face of the support frame, and which makes contact with the forward face of at least one of the roller housings supported for limited movement in a direction perpendicular to the axis of the upper and lower rollers.

In the case when the roller housing in question is not easily accessible, for example when the roller housing is located within the support frame, the load cell may contact the roller housing through some kind of intermediary means such as a rod inserted in a hole formed in the wall of the support frame having one end in contact with the roller housing and the other end in contact with the load cell.

By mounting the load cell on the external face of the support frame, the load cell can be easily accessed for maintenance, replacement etc.

It is preferable that both the upper and lower rollers are respectively supported for rotation in upper and lower roller housings supported by the support frame, wherein the upper roller housing is supported by the support frame for vertical displacement with respect to the lower roller such that the size of the gap between the upper and lower rollers may be adjusted as desired. In this case, it is preferable that detection means detects the force at which the lower roller housing is pushed in a direction away from the extruder unit as a result of the accumulation of extruded material in the bank.

Another aspect of the present invention provides a roller head extruder unit comprising: an extruder unit having an exit opening at one end through which material is extruded; support frame mounted securely with respect to the extruder unit; a pair of upper and lower rollers positioned forward of the exit opening to receive extruded material therebetween, and supported for rotation by the support frame; a pair of sideguides mounted on either side of the space between the exit opening and the upper and lower rollers to thereby define together with the upper and lower rollers and the exit opening a bank into which the material is extruded; and at least one pressure sensor installed in at least one of the sideguides for detecting the pressure of the material accumulated in said bank. The pressure sensor may for example be a pressure sensor fitted in a through hole formed in one of the side guides.

Such a pressure sensor has the advantage that it detects directly the actual pressure of the material accumulated in the bank. Also, in the case when the pressure sensor is fitted into a through hole formed in one of the sideguides, it becomes a simple task to remove the sensor for maintenance, replacement etc.

BRIEF DESCRIPTION OF THE FIGURES

FIGS. 4(a), 4(b) and 4(c) show three possible variations of the embodiment of the present invention shown in FIG. 1.

DETAILED DESCRIPTION OF THE EMBODIMENTS

The embodiments of the present invention shall be described hereunder with reference to the accompanying Figures.

Figure 1:
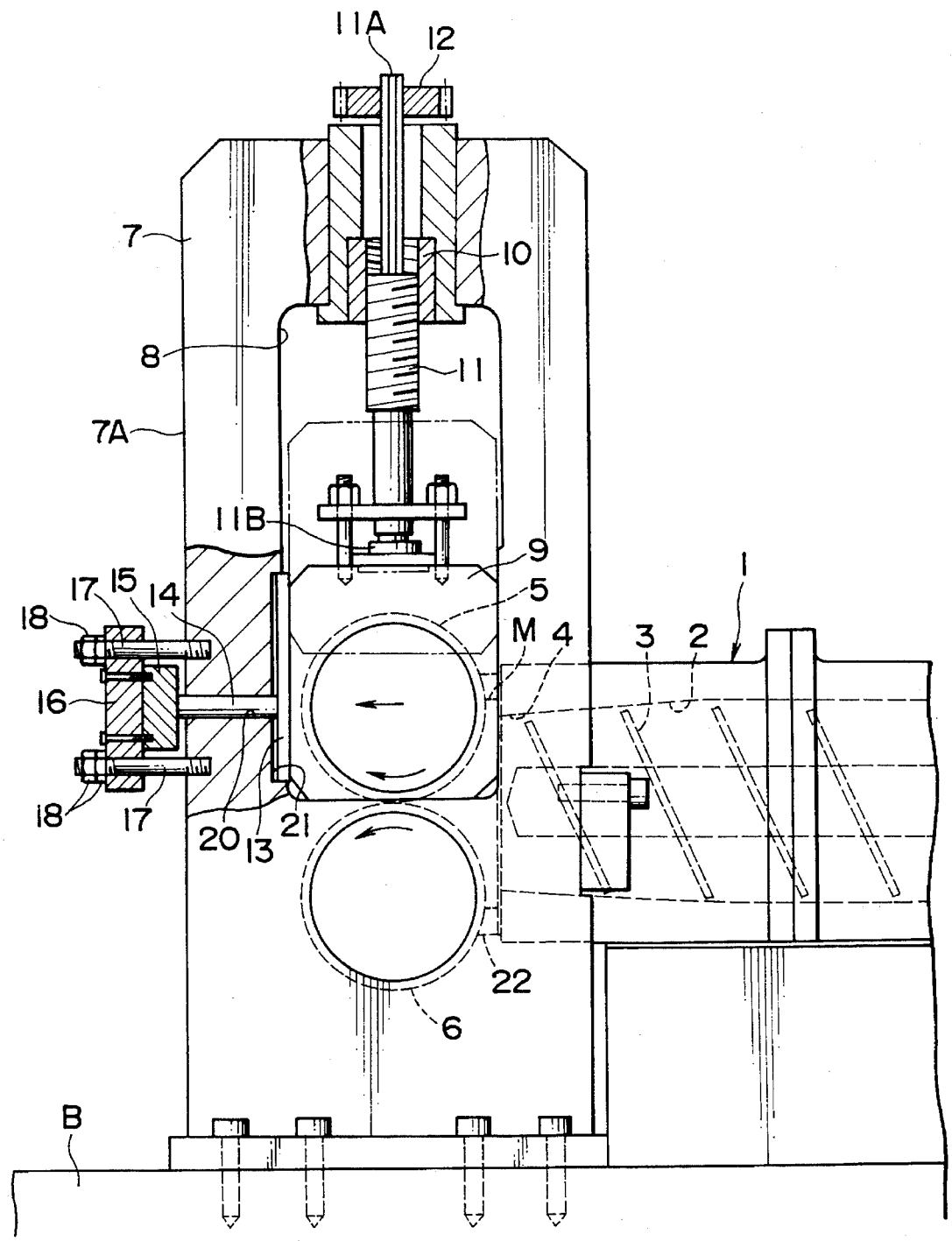
FIG. 1 is a cross-sectional view of an embodiment of the present invention.
Figure 2:
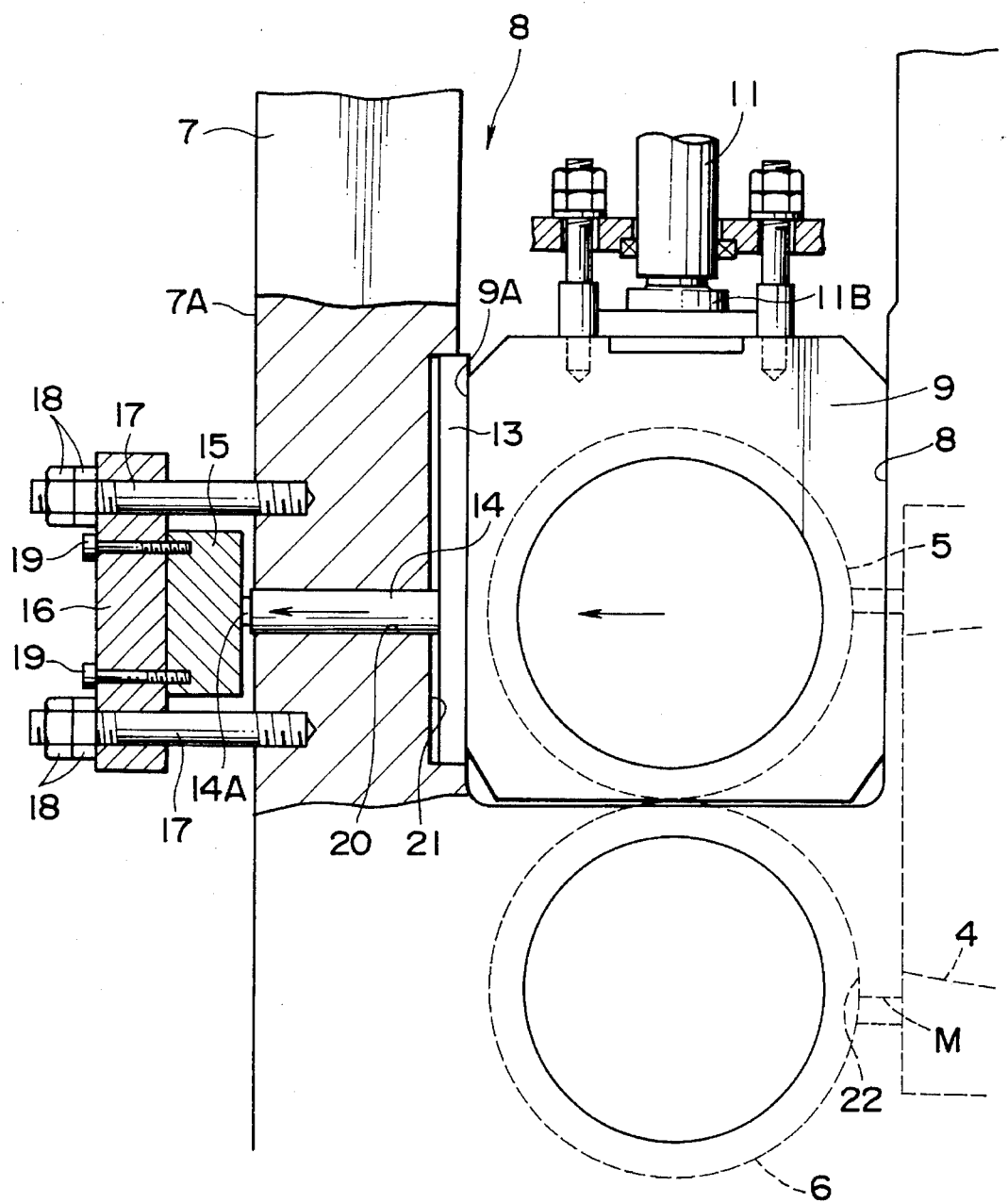
FIG. 2 is an enlarged view of the upper roller housing and detection means of the embodiment shown in FIG. 1.

FIGS. 1 and 2 show a first embodiment of the present invention. An extruder unit 1 has a screw 3 provided in a chamber 2, and a macromolecular material e.g. rubber supplied from a supply chute (not shown) is extruded by the screws out through the exit opening 4. Upper and lower calender rollers 5, 6 are provided forward of the exit opening 4 for rolling the rubber extruded from the opening into a rubber sheet.

A pair of left and right frames 7 are securely mounted on a base B forward of and on either side of the exit opening 4. Lower calender roller 6 is supported for rotation by said frames 7. Upper calender roller 5 is supported for rotation in an upper roller housing 9 which is itself slotted into windows 8 formed in frames 7 for vertical displacement with respect to said lower calender roller 6. Upper and lower calender rollers 5, 6 are set up for interlinked drive by drive means (not shown).

A spindle 11 associated with each of the frames 7 is screw fitted into a nut 10 mounted on the upper end of the respective frame 7, and the lower end 11B of each spindle 11 is connected for free rotation to the upper roller housing 9. A gear wheel 12 is attached to the upper end 11A of each spindle 11. Upon rotation of this gear wheel 12, the spindle 11 rotates and is displaced vertically. The upper roller housing 9 and upper roller 5 supported by the upper housing 9 is displaced vertically therewith, and thus the size of the gap between the rollers and hence the thickness of the rolled sheet can be adjusted.

As shown in FIGS. 1 and 2, a through hole 20 is formed in each frame 7 on the front side of windows 8 at about the same height as the axis of the upper calender roller 5. A rod 14 fixed at right angles to the front side of a pressure plate 13 is inserted into each through hole 20 for free displacement along the axis of the through hole 20 (i.e. in a direction parallel to the direction of the axis of screw 3). The front end 14A of rod 14 protrudes slightly from the front face of frame 7, and at the same time pressure plate 13 is in contact with the front face of upper roller housing 9.

A load cell 15, provided as means for detecting the bank quantity is fixed, in such a way that it's position may be changed, to the front face 7A of frame 7, through fixer 16 by means of nut 18 and bolt 17, so as to face the end of rod 14. 19 designates a load cell fixing bolt. The load cell 15 can easily be removed by removing bolt 19 after loosening the nut 17 of bolt 18 and thus maintenance and interchange of the load cell is extremely simple as is the fixing of the load cell.

The window 8 has a concaved section 21 formed in the front side thereof to receive pressure plate 13. When roller housing 9 is vertically displaced it slides up and down against pressure plate 13. Also, a pair of left and right sideguides 22 are respectively mounted on the left and right sides of the space between the exit opening 4 of the extruder unit 1 and the calender rollers 5, 6. They are mounted for possible displacement in the left-right direction (i.e. in a direction parallel to the axes of the calender rollers), such that the size of the gap between them may be adjusted. These sideguides 22 control the width of the extruded material M and thus determine the width of the final rolled sheet.

Next, the operation of the above described embodiment shall be described.

Material is extruded by screws 3 of the extruder unit 1 out of the exit opening 4 and into the space (bank) formed between the calender rollers 5, 6, the sideguides 22 and the exit opening 4, and accumulates there to form a mass of extruded material M which applies a head pressure. Since both the extruder unit 1 and the frames 7 are securely fixed, this head pressure acts against the calender rollers in the forward direction (direction shown by arrow in the Figure). As a result, upper roller housing 9 supporting upper roller is pushed against pressure plate 13. Rod 14 attached to pressure plate 13 is thus pushed against load cell 15, and thus the size of said head pressure is detected by load cell 15.

The strain on the load cell is output as an electric signal to an amplifier where it is amplified, and then sent to the motor for driving the screws 3 of the extruder and the motor for driving the rotation of the calender rollers 5, 6. Thus the rotation speed of each motor is controlled. Conventional means may be employed as the signal transmission means 23 for transmitting the output signal of the load cell 15 to each motor, and an example thereof shall be described hereunder with reference to FIG. 3.

Figure 3:
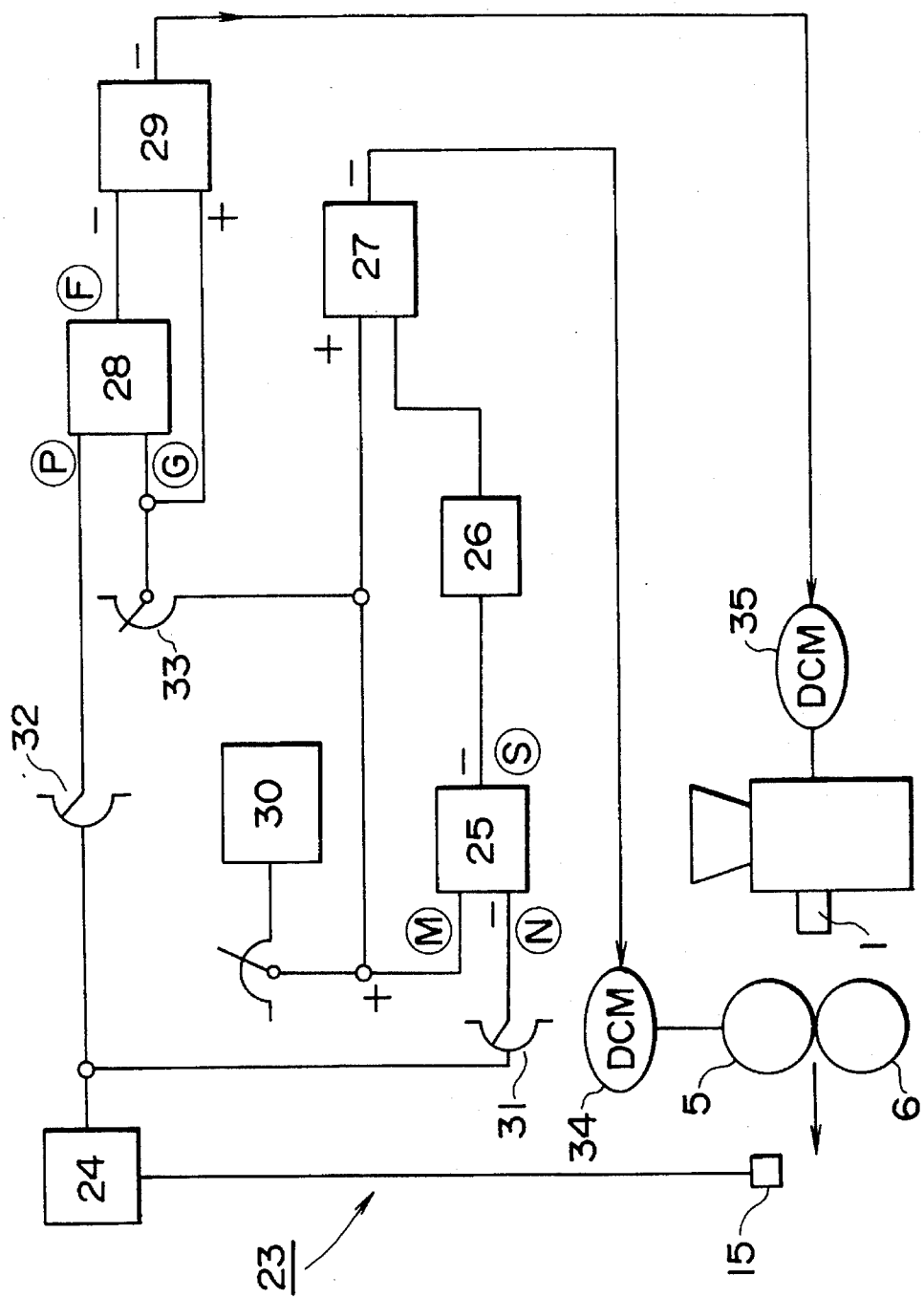
FIG. 3 is a block diagram showing an example of signal transmission means.

In FIG. 3, signal transmission means 23 comprises amplifier 24, multiplier 25, signal invertor 26, accumulator 27, multiplier 28, accumulator 29, line speed setting unit 30, volume setting unit 31, 32 and ratio setting unit 33. 34 designates the motor for driving the calender rollers and 35 designates the motor for driving the screws of the extruder.

The output voltage of load cell 15 is amplified by amplifier 24; a voltage set by line speed setting unit 30, and the voltage N resulting from the amplification by amplifier 24 of the voltage from load cell are multiplied together by multiplier 25, and the output S of multiplier 25 is added to the set voltage M by accumulator 27. If this value is compared with the original voltage M, the correction ratio of the speed of the calender rollers is obtained. The output signal of the accumulator is input into the control circuit of the extruder motor 35, and the rotation speed of the screw is adjusted in accordance with the correction ratio, and the bank quantity is controlled to a specific quantity.

Also, a voltage F calculated by multiplier 28 by multiplying a voltage Q from ratio setting unit 33, and a voltage P resulting from the amplification of the output of the load cell 15 (corresponding to voltage N) is added to voltage Q by accumulator 29. If this value is compared with the original voltage Q, the correction ratio of the rotation speed of the screw of the extruder is obtained. The output signal of the accumulator is input into the control circuit of the extruder motor 35; the rotation speed is adjusted in accordance with the said correction ratio, and the bank quantity is controlled to a specific quantity.

FIGS. 4(a)–4(c) show other possible variations of the embodiment described above. In the embodiment shown in FIG. 4(a), the lower calender roller 6 is also supported by said frame through lower roller housing 91. Pressure plate 13 is in contact with the lower roller housing and the force by which the lower roller housing is pushed is detected by load cell 15.

The embodiment shown in FIG. 4(b) differs from the embodiment shown in FIG. 4(a) in that pressure plate 13 is mounted for contact with both upper and lower roller housings 9, 91. The force by which both the housings is pushed is detected by load cell 15.

FIG. 4(c) shows an embodiment in which the plate 13 is omitted and in which rod 14 is pushed directly by upper roller housing 9. Plate 13 may also be omitted in the case of the embodiments shown in FIG. 1 and 4(a).

The same kind of effect achieved in the case of the embodiment shown in FIG. 1 can also be expected for the embodiments shown in FIGS. 4(a)–4(c).

The extruded material M tends to fill the space between the calender rollers 5, 6 approximately uniformly, and thus there is no variance in the force received by the upper and lower calender rollers. Consequently, the bank quantity can be accurately detected regardless of whether the force exerted on the upper calender roller 5 or the force exerted on the lower calender roller 6 is detected.

In the case of the embodiment shown in FIG. 4(a), in which the pressure plate 13 is contacted with the lower roller housing 91 and the force with which the lower roller housing is pushed is detected by load cell 15, the bank quantity can be detected with even greater accuracy compared to the case when the pressure plate 13 is in contact with the upper roller housing 9, because the head pressure is communicated to the detection means without being effected by any action of the spindle 11.

Figure 5:
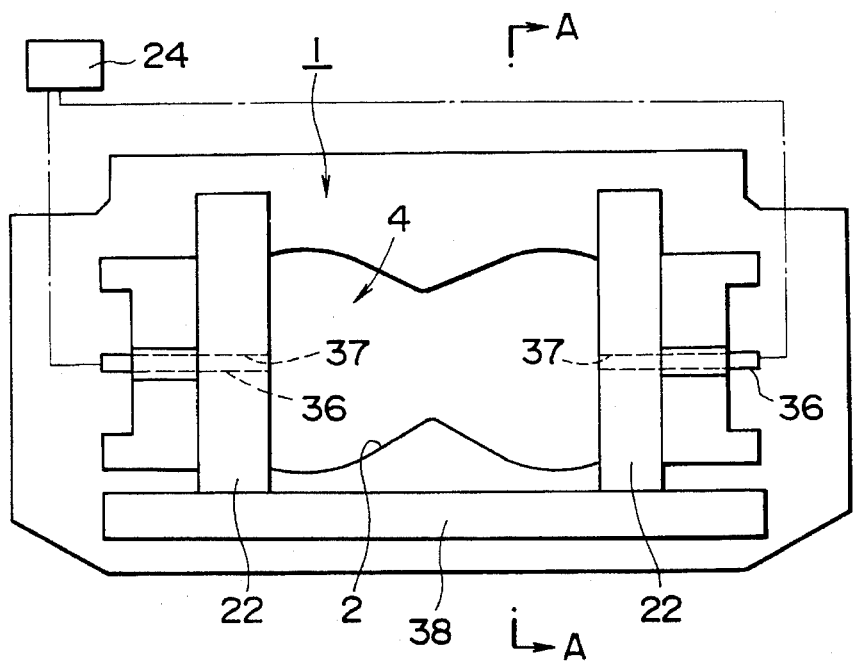
FIG. 5 is a view of the detection means of another embodiment of the present invention.
Figure 6:
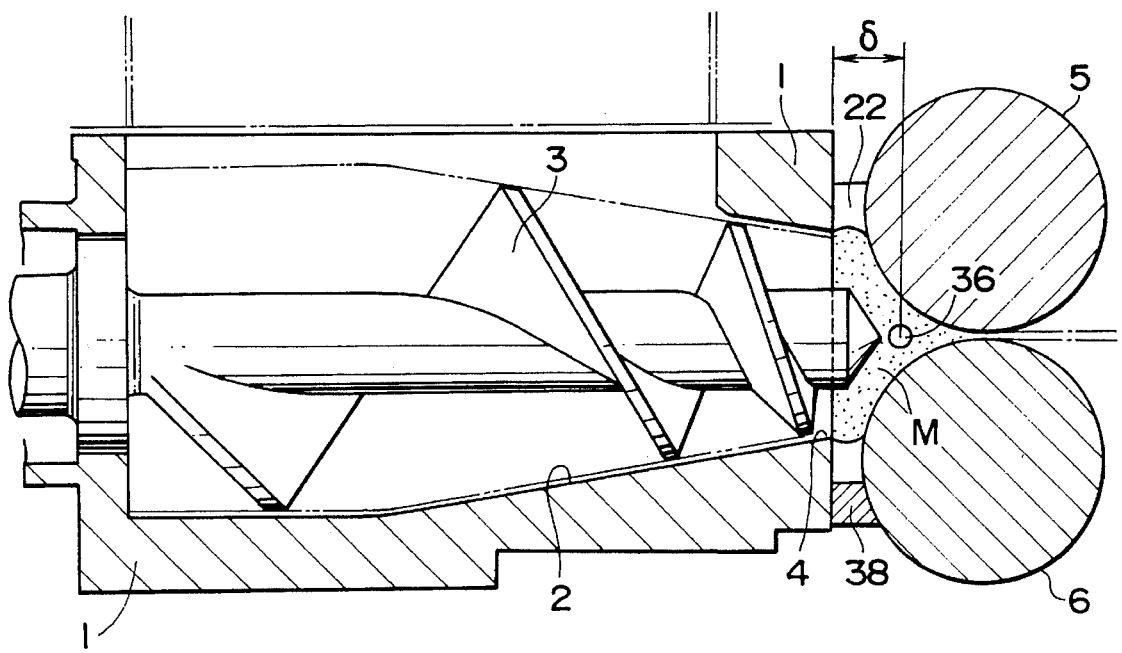
FIG. 6 is a view of the cross-section taken in the plane shown by A—A of FIG. 5.
Figure 7:
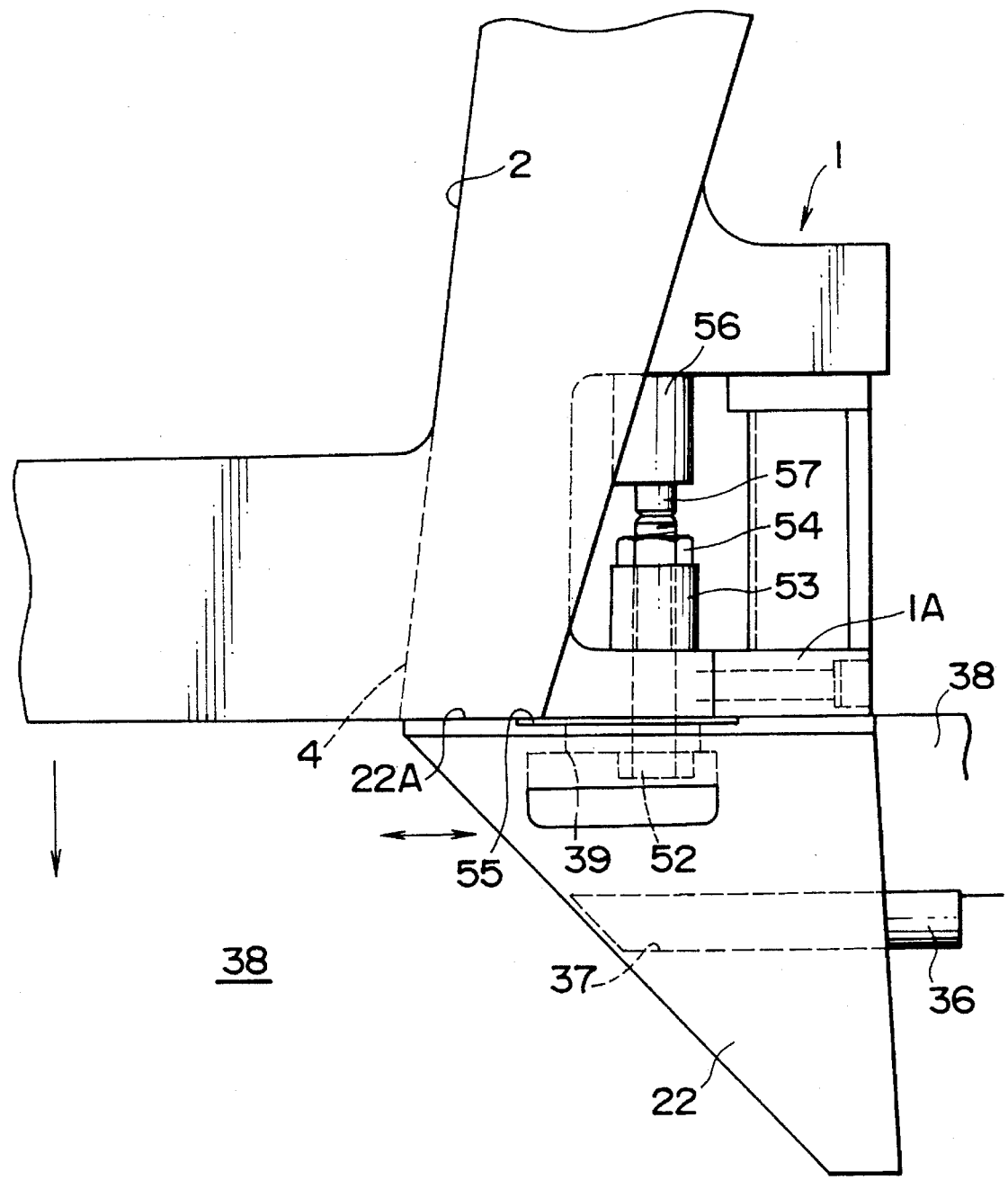
FIG. 7 is a detailed view of the side guides of the embodiment shown in FIG. 5.
Figure 8:
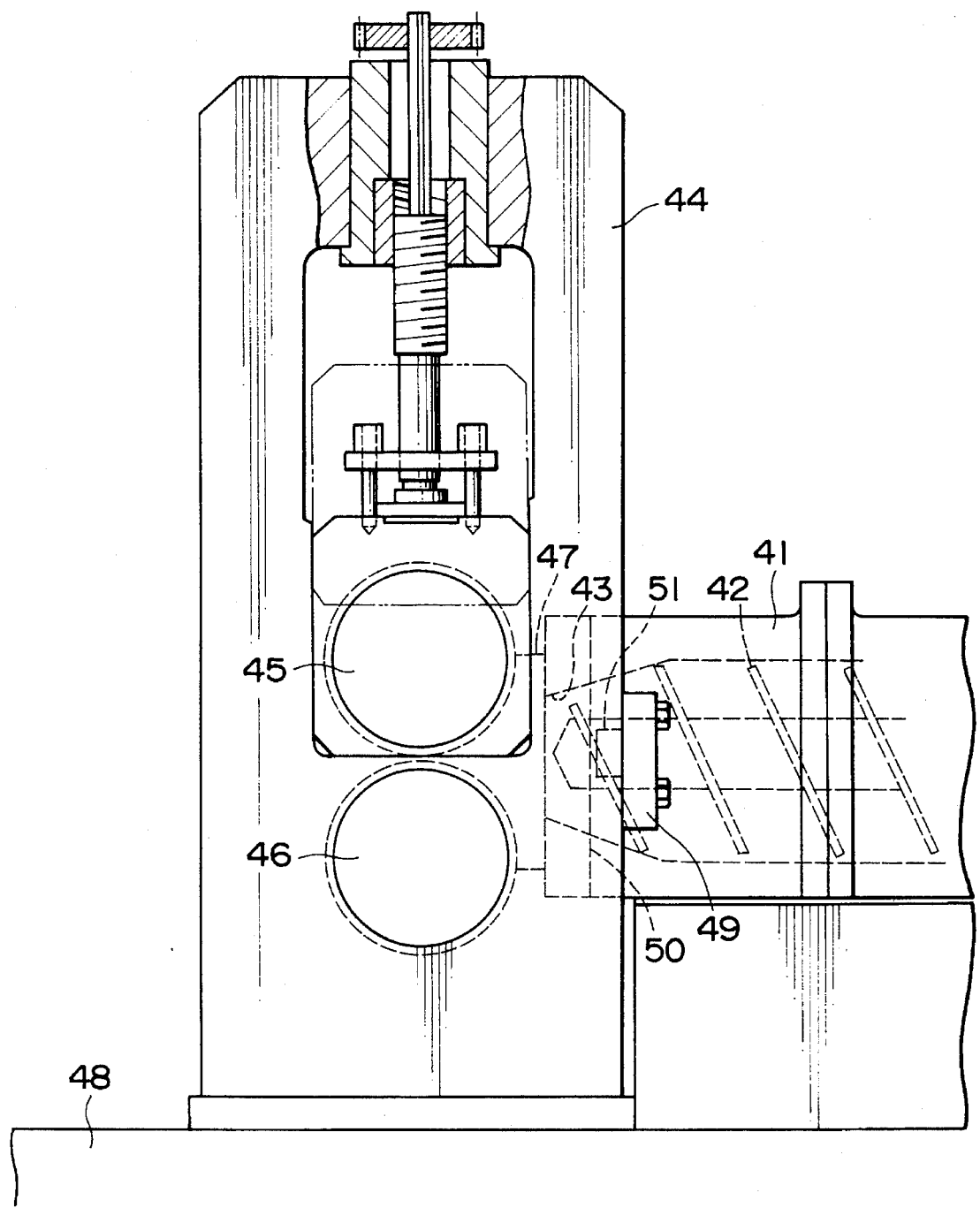
FIG. 8 is a cross-sectional view of a roller head extruder unit of the prior art.
Figure 9:
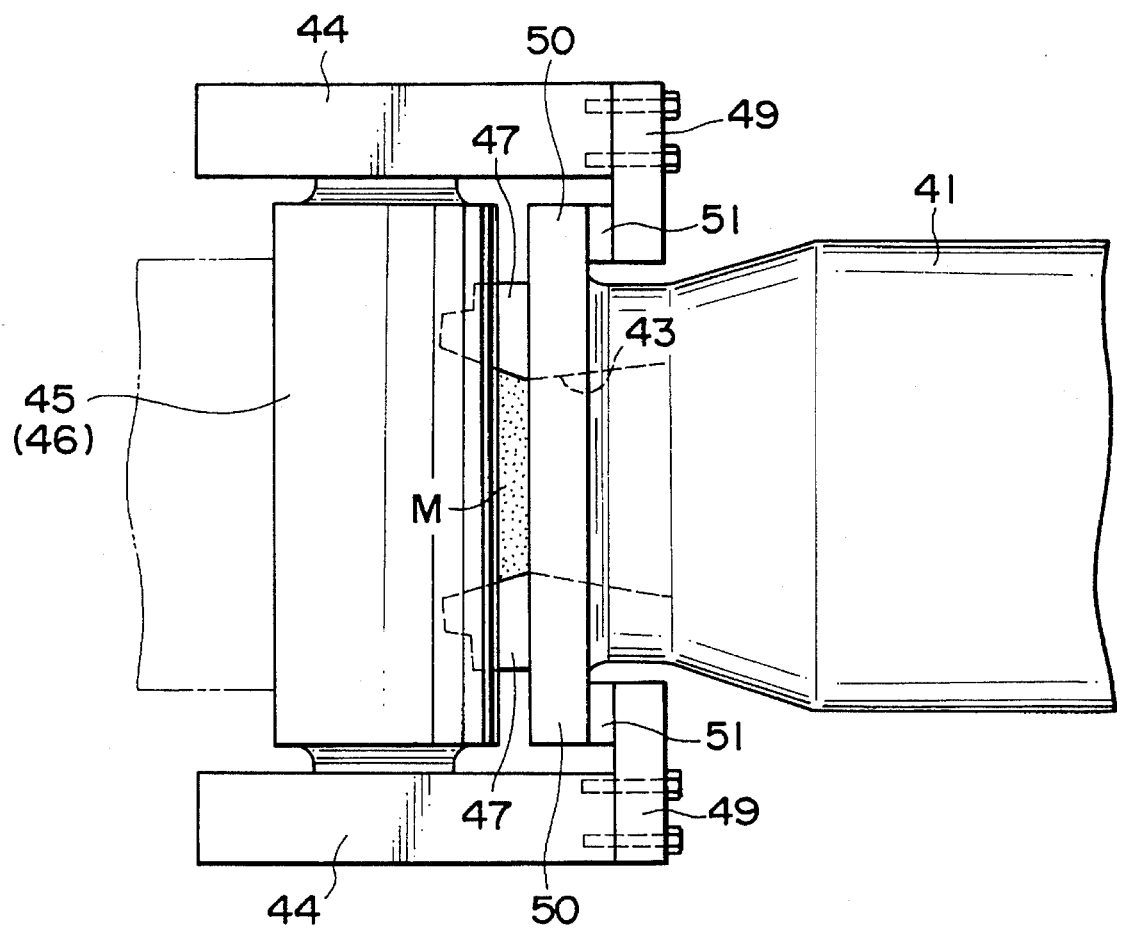
FIG. 9 is a generalized view from above of the prior art extruder unit shown in FIG. 8.

FIGS. 5–7 show the essential components of another embodiment of the present invention. It differs from the embodiment shown in FIG. 1 in that a pressure sensor 36 employed as the head pressure detection means is installed in each of the side guides 22. The bank head pressure is detected directly by sensors 36 and a corresponding electric signal is output to an amplifier 24 of a signal transmission means of the kind shown in FIG. 3.

Each pressure sensor 36 is screw fitted into a mounting hole 37 formed in each of the respective side guides 22, and thus the structure is simple and requires no moving parts. As a consequence, even slight fluctuations in the head pressure can be assuredly detected; the amount of material M in the bank can be kept to a necessary minimum; the position of the pressure sensor 36 (the distance S from the front end face of the extruder 1) is not an influencing factor; operation in which a bank amount is reduced compared to the prior art devices is possible; the hold-up time of the material is reduced; and, by using the pressure sensor, the period in which control under constant conditions is possible is lengthened.

This embodiment differs from the embodiments shown in FIGS. 1 and 2 only in that the position of the means for detecting the head pressure of the bank is different; the remaining construction and operation is the same. Thus, a detailed description of those common parts shall be omitted and the same reference numbers shall be used to designate common parts.

The sideguides 22 are mounted for displacement in the left-right direction on lower holding component 38, and as shown in FIG. 7, they are fastened to the flange 1A of the extruder unit 1 by nut 54, spring 53 and fixing bolt 52 inserted in fixing hole 39 extending in the left-right direction. A shallow concave section 55 is formed in the face of the sideguide contacting the flange 1A i.e. face 22A, to increase the pressure at which the two surfaces are held together, thus preventing extruded material from seeping onto face 22A.

A dish spring may be employed as spring 53, and the sideguide 22 is pushed against front face of the flange 1A by the set load of the spring. Also, a hydraulic cylinder 56, provided as means for disengaging the pushing force applied by the spring 53, is located towards the rear end of fixing bolt 52, such that the end of the rod of the hydraulic cylinder faces the end of fixing bolt 52. When effecting adjustment of the gap between the sideguides 22 by displacing the sideguides in the left right direction (direction shown by the arrow in FIG. 7), the cylinder 56 is operated at a force greater than the set load of the spring 53 in order to release the pushing force acting upon the sideguides 22, and the side guides 22 may be displaced to the extent desired and thus the gap size may be adjusted easily and quickly without the need to loosen nut 54.

The means for moving the sideguide 22 in the left-right direction is not shown in the Figure, but a screw-jack, cylinder etc. may be employed thereas. Control of the distance between the left and right sideguides 22, i.e., determination of the width of the rolled sheet can be effected automatically and quickly, and thus increases in productivity and decreases in cost are made possible.

In addition, a load cell could be used as the detection means in which case the bank head pressure acting on the side guides is indirectly measured in a similar way to the embodiment shown in FIG. 1.

This invention is not limited to the embodiments described above; for example, a strain gauge, a differential transformer, selsyn or other means for transforming changes in position to an electric signal could be employed instead of the load cell.

What is claimed is:

1. A roller head extruder for forming sheets of extruded material comprising:

an extruder unit having an exit opening at one end through which material is extruded;

a support frame mounted securely with respect to said extruder unit;

a pair of upper and lower rollers positioned forward of said exit opening with respect to an extrusion direction, to receive extruded material therebetween, and supported for rotation by said support frame, wherein at least one of said upper and lower rollers is supported for rotation in a first roller housing, said first roller housing being supported by said support frame for limited movement in a direction perpendicular to an axis of said upper and lower rollers;

a pair of sideguides mounted on either side of a space between said exit opening and said upper and lower rollers to thereby define together with said upper and lower rollers and said exit opening a bank into which said material is extruded; and detection means for detecting a force by which said first roller housing supported for limited movement in a direction perpendicular to the axis of said upper and lower rollers is pushed in a direction away from said extruder unit as a result of an accumulation of material extruded from said extruder unit in said bank;

wherein said detection means is located on said support frame forward of said upper and lower rollers with respect to the extrusion direction and comprises a load cell and a pressure plate operatively connected to said load cell, said pressure plate pressing against a first side face of the first roller housing which is opposite to a second side face of the first roller housing which faces the extruder unit.

2. The roller head extruder unit according to claim 1, further comprising a second roller housing, one of said first and second roller housings being an upper roller housing and the other of said first and second roller housings being a lower roller housing, wherein said upper roller is mounted for rotation in said upper roller housing which is supported by said support frame for vertical displacement with respect to said lower roller housing, said lower roller being supported in said lower roller housing supported for limited movement in a direction perpendicular to the axis of said upper and lower rollers, said detection means detecting the force by which at least one of said upper and lower roller housings is pushed in a direction away from said extruder unit as a result of the accumulation of said material in said bank.

3. The roller head extruder according to claim 2, wherein said pressure plate presses on said upper roller housing.

4. The roller head extruder according to claim 2, wherein said pressure plate presses on said lower roller housing.

5. The roller head extruder according to claim 2, wherein said pressure plate presses on both of said roller housings.

6. The roller head extruder according to claim 2, wherein said detection means comprises a rod extending through said support frame which connects said pressure plate to said load cell.

7. The roller head extruder according to claim 1, wherein said pressure plate is substantially perpendicular to the extrusion direction.

* * * * *